(12) United States Patent
Nestares et al.

(10) Patent No.: US 11,256,949 B2
(45) Date of Patent: Feb. 22, 2022

(54) GUIDED SPARSE FEATURE MATCHING VIA COARSELY DEFINED DENSE MATCHES

(71) Applicant: INTEL CORPORATION, Santa Clara, CA (US)

(72) Inventors: Oscar Nestares, San Jose, CA (US); Niloufar Pourian, Los Gatos, CA (US)

(73) Assignee: INTEL CORPORATION, Santa Clara, CA (US)

( * ) Notice: Subject to any disclaimer, the term of this patent is extended or adjusted under 35 U.S.C. 154(b) by 81 days.

(21) Appl. No.: 16/455,980

(22) Filed: Jun. 28, 2019

(65) Prior Publication Data
US 2019/0318196 A1 Oct. 17, 2019

(51) Int. Cl.
*G06K 9/62* (2006.01)
*G06K 9/46* (2006.01)

(52) U.S. Cl.
CPC .......... *G06K 9/6211* (2013.01); *G06K 9/4671* (2013.01); *G06K 9/6212* (2013.01); *G06T 2207/10012* (2013.01)

(58) Field of Classification Search
CPC .. G06K 9/6211; G06K 9/4671; G06K 9/6212; G06T 2207/10012
See application file for complete search history.

(56) References Cited

U.S. PATENT DOCUMENTS

| | | | | |
|---|---|---|---|---|
| 2011/0116711 A1* | 5/2011 | Wang | ................... | G06K 9/4671 |
| | | | | 382/165 |
| 2013/0022280 A1* | 1/2013 | Liu | ...................... | G06K 9/6202 |
| | | | | 382/224 |
| 2014/0133741 A1* | 5/2014 | Wang | ...................... | G06T 7/543 |
| | | | | 382/154 |
| 2015/0097827 A1* | 4/2015 | Cohen | ..................... | G06T 5/005 |
| | | | | 345/420 |
| 2019/0066373 A1* | 2/2019 | Tran | ................... | G06K 9/00785 |

(Continued)

OTHER PUBLICATIONS

Lowe, David; "Object Recognition from Local Scale-Invariant Features" ICCV '99 Proceedings of the International Conference on Computer Vision—vol. 2—Volume Sep. 2, 1999, 8 pages.

(Continued)

*Primary Examiner* — Santiago Garcia
(74) *Attorney, Agent, or Firm* — Hanley, Flight & Zimmerman, LLC

(57) ABSTRACT

An example method is described herein. The method includes executing dense feature matching on an image pair that is down sampled to obtain a first set of feature correspondences for each pixel of the down sampled image pair. The method also includes calculating a neighborhood correspondence based on the first set of feature correspondences for each pixel in a first image of the image pair. Further, the method includes executing sparse feature matching on stereoscopic patch pairs from the image pair based on the neighborhood correspondence for each pixel to obtain correspondence estimates for each stereoscopic patch pair. Finally, the method includes refining the correspondence estimates for each stereoscopic patch pair to obtain a semi-dense set of feature correspondences by applying a geometric constraint to the correspondence estimates and retaining correspondences that satisfy the geometric constraint.

25 Claims, 8 Drawing Sheets

(56) References Cited

U.S. PATENT DOCUMENTS

2019/0122378 A1* 4/2019 Aswin .................. G06T 5/003
2020/0327695 A1* 10/2020 Lin .................. G06F 16/9027
2020/0394444 A1* 12/2020 Yang .................. G06F 17/16

OTHER PUBLICATIONS

Harris, Chris, Stephens, Mike; "A combined corner and edge detector." Proceedings of the 4th Alvey Vision Conference, Manchester, pp. 147-151. Sep. 1988.
Lowe, David; "Distinctive image features from scale-invariant keypoints", International Journal of Computer Vision, Nov. 2004 vol. 60 Issue 2 pp. 91-110.
Dalal, et al."Histograms of oriented gradients for human detection" Published in: 2005 IEEE Computer Society Conference on Computer Vision and Pattern Recognition (CVPR'05) San Diego CA Jun. 2005.
Leutenegger, et al; "BRISK: Binary robust invariant scalable keypoints." Published in: 2011 International Conference on Computer Vision, Nov. 2011 Barcelona Spain 8 pages.
Alcanatarilla; et al. "KAZE features" European Conference on Computer Vision ECCV 2012: Computer Vision—ECCV, Oct. 2012, pp. 214-227.
Matas et al; "Robust Wide Baseline Stereo from Maximally Stable Extremal Regions" Image and Vision Computing 22(10):761-767 • Sep. 2004 Cardiff U.K. 10 pages.
Rublee et al.; "ORB: An efficient alternative to SIFT or SURF." Published in: 2011 International Conference on Computer Vision , Nov. 2011, Barcelona Spain, 8 pages.
Hu, et al; "Efficient coarse-to-fine patchmatch for large displacement optical flow." Published in: 2016 IEEE Conference on Computer Vision and Pattern Recognition (CVPR) Las Vegas NV, 9 pages.
Revaud et al; "Epicflow: Edge-preserving interpolation of correspondences for optical flow." Computer Science > Computer Vision and Pattern Recognition Apr. 2015, 12 pages France.
Bailer et al; "Flow fields: Dense correspondence fields for highly accurate large displacement optical flow estimation." Published in: IEEE Transactions on Pattern Analysis and Machine Intelligence (vol. 41 , Issue: 8 , Aug. 2019) 9 pages, University of Kaiserslautern.
Dosovitskiy et al; "Flownet: Learning optical flow with convolutional networks." Published in: 2015 IEEE International Conference on Computer Vision (ICCV) Dec. 2015, Santiago Chile. 9 pages.
Yu et al;"DNN Flow: DNN Feature Pyramid based Image Matching." Conference: British Machine Vision Conference, Jan. 2014, 10 pages.
Kim et al; "Deformable spatial pyramid matching for fast dense correspondences." Published in: 2013 IEEE Conference on Computer Vision and Pattern Recognition , Oct. 2013 Portland OR, 8 pages.
Pinggera et al; "On cross-spectral stereo matching using dense gradient features." British Machine Vision Conference 2012, Jan. 2012, 12 pages.
Brox et al; "Large displacement optical flow: descriptor matching in variational motion estimation." IEEE Transactions on Pattern Analysis and Machine Intelligence (vol. 33 , Issue: 3 , Mar. 2011) Aug. 2010. 14 pages.
Barnes et al; "PatchMatch: A randomized correspondence algorithm for structural image editing." SIGGRAPH '09 ACM SIGGRAPH 2009 papers, ACM Transactions on Graphics, Aug. 2009 New Orleans LA 21 pages.
Liu, et al; "Sift flow: Dense correspondence across scenes and its applications." Published in: IEEE Transactions on Pattern Analysis and Machine Intelligence (vol. 33 , Issue: 5 , May 2011, Referenced in: IEEE Biometrics Compendium, IEEE RFIC Virtual Journal, IEEE RFID Virtual Journal. 14 pages.
Bao et al; "Fast edge-preserving patchmatch for large displacement optical flow." Published in: IEEE Transactions on Image Processing (vol. 23 , Issue: 12 , Dec. 2014) CVPR '14 Proceedings of the 2014 IEEE Conference on Computer Vision and Pattern Recognition Washington D.C. pp. 3534-3541.
Fischler et al; "Random sample consensus: a paradigm for model fitting with applications to image analysis and automated cartography." Article in Communications of th ACM 24(6) Jan. 1981. pp. 381-395.
Beardsley et al; "3D model acquisition from extended image sequences." Conference: Computer Vision—ECCV'96, 4th European Conference on Computer Vision, Cambridge, UK, Apr. 15-18, 1996, Proceedings, vol. II, 13 pages.

* cited by examiner

102

104

100

202

204

200

GUIDED SPARSE FEATURE MATCHING VIA COARSELY DEFINED DENSE MATCHES

BACKGROUND

Feature matching compares features detected in one or more images. Various data can be derived from the comparison of features during feature matching. For example, features may be matched for further processing in a number of computer vision applications. Moreover, feature matching can form the basis of many camera calibration techniques.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
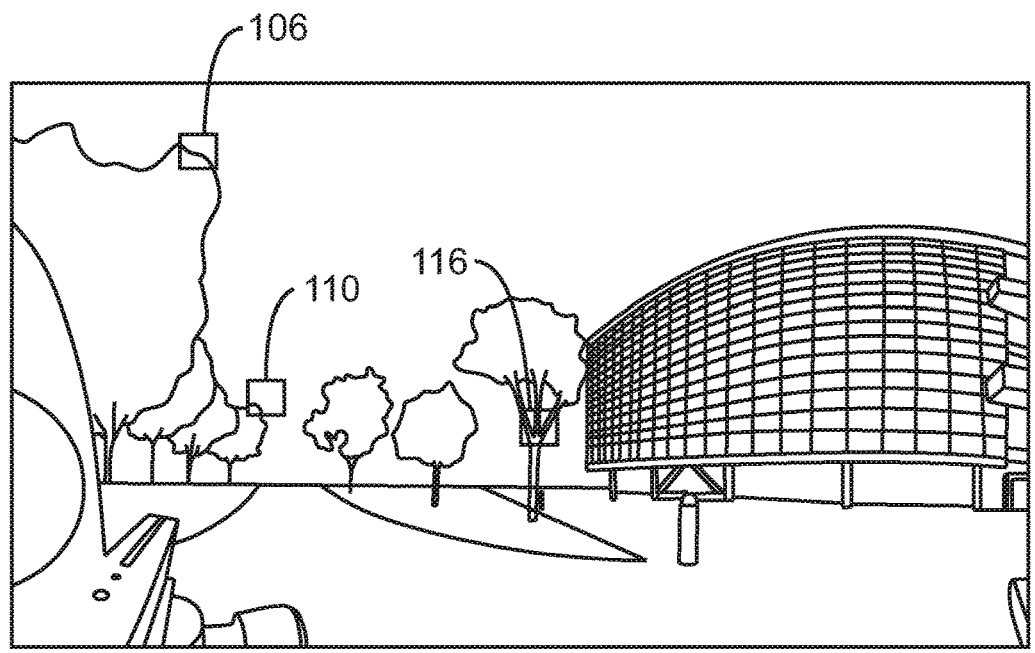
FIG. 1 is a stereoscopic pair of images with sparse feature patches.
Figure 1:
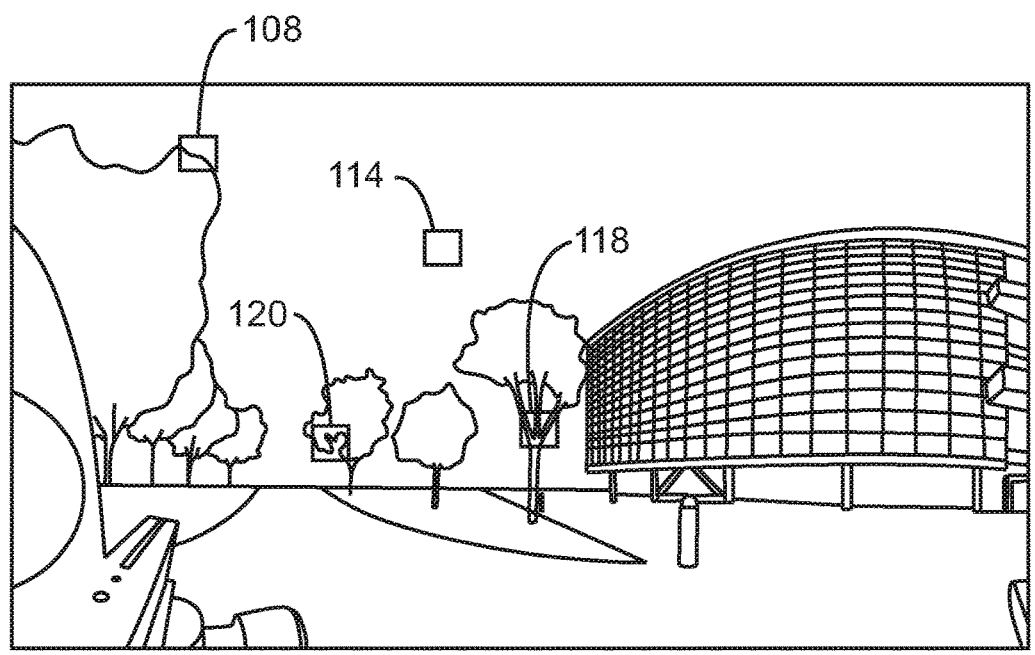

Generally, feature matching discovers a relationship between features in a pair of images. A feature may be a point in an image that is identifiable according to some content. Additionally, a feature may be a unique data point of an image that can be identified across a plurality of images. Thus, features may include corners, edges, ridges, or blobs. Features, as described herein, may be determined according to any feature detection techniques. Detected features may be described by descriptors. Feature matching may be used to determine correspondences between detected features in the image. In some cases, the correspondences may be defined by a distance function that compares the descriptors of two detected features. The correct feature may be the feature with a minimum distance.

Sparse feature matching may refer to matching features found in one or more images with patches that are centered on sparsely located interest points. In some cases, the sparsely located interest points may be selected with no loss of generality, where each point is selected according to a same reason. Sparse feature matching techniques include, but are not limited to applying a nearest neighbor search or ratio test to feature representations defined using SIFT, SURF, or any other representation. Dense feature matching may refer to matching features found in one or more images at each pixel or at a regularly sampled grid of points. The dense features can be defined using SIFT, local binary pattern (LBP), or any combination thereof. In dense feature matching, a local search space may be constrained for each located interest point. The interest point may be determined via sparse feature matching techniques.

The present techniques enable guided sparse feature matching via coarsely defined dense matches. In particular, semi-dense feature correspondences are derived from features extracted from pair of images. In embodiments, the pair of images is a stereoscopic pair of images. A semi-dense (a large number of) feature correspondences may be determined with a better than quarter-pixel accuracy across stereo images in an efficient manner according to the present techniques. In computer vision applications, a large number of correspondences can be used to derive additional observations to enable a more accurate model for computer vision application parameters.

Many computer vision applications (such as calibration) require such correspondences to have at least quarter-pixel accuracy. However, defining a large number of quarter-pixel accurate feature correspondences effectively can be a challenging can be challenging as well as computationally expensive. For example, conventional dense matching attempts to find dense correspondences, such as a correspondence for each pixel of an image. Such approaches are typically computationally heavy with at most half-pixel accuracy. By contrast, conventional sparse feature matching approaches are computationally less expensive and generally benefit from a better than quarter-pixel accuracy for the defined correspondences. However, the correspondences are defined for a limited number of pixels in an image. In addition, conventional sparse feature matching approaches tend to have a higher rate of mismatches, as they do not consider spatial smoothness. As used herein, spatial smoothness may refer to a geometric smoothness between neighboring pixels.

FIG. 1 is a stereoscopic pair of images with sparse feature patches. A stereoscopic pair of images may be a first image and a left image from two different locations. Thus, the images may be offset and capture a same scene from slightly different viewpoints. One image may be referred to as a left image, and the other image may be referred to as the right image. The view in the left image may overlap with the view from the right image. Feature matching enables a machine to be trained using features where the resulting match of the feature is known. In particular, features may be matched for further processing in a number of computer vision applications. For example, feature matching as described herein may be used in applications including but not limited to, drones, navigation, image alignment, object recognition, three-dimensional reconstruction, motion tracking, indexing and content-based retrieval.

Generally, sparse feature matching may refer to deriving point correspondences in a pair of images for a limited number of pixels. Sparse feature matching enables a coarse estimate of correspondences between a pair of images while being computationally low cost. As used herein, sparse feature matching may refer to deriving correspondences for distinctive points or patches of interest in a set of images. The points may be detected according to various feature detection techniques that extract features based on some level of distinctiveness.

Accordingly, FIG. 1 illustrates a pair of stereoscopic images 102 and 104. Image 102 includes patches 106, 110, and 116. Similarly, image 104 includes patches 108, 114, 118, and 120. In sparse feature matching according to the present techniques, the patches 106, 108, 110, 112, 114, 116, 118, and 120 derived from coarse dense feature matching as described below. Guided sparse feature matching refers to feature matching for a patch of pixels based on a correspondence estimate. The correspondence estimate can be calculated via dense matching on a coarse level. By using dense feature matching to derive a correspondence estimate, the present techniques enable a framework for sparse feature matching that incorporates spatial smoothness along with geometric constraints. In this manner, sparse feature matching according to the present techniques significantly increases the number of correct matches with at least quarter-pixel accuracy, while keeping the computational cost smaller than that of dense matching alone.

The sparse correspondences obtained as a result of conventional sparse feature matching may result in fewer correspondences in unstructured image regions. Typical sparse matching techniques establish candidate matches by using discriminative features, such as SIFT, at a relatively low cost. However, those candidate matches usually include only a small portion of all the true matches. Often, possible matches are considered outliers. At any rate, conventional sparse feature matching lacks the use of any geometrical or spatial smoothness constraints.

Figure 2:
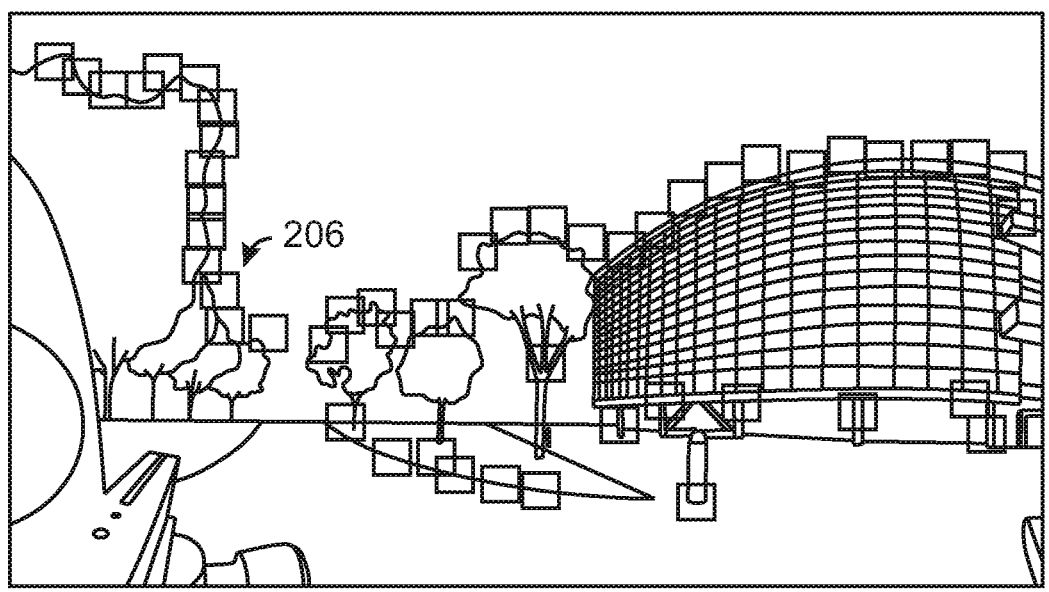
FIG. 2 is a stereoscopic pair of images with coarsely derived dense feature points.
Figure 2:
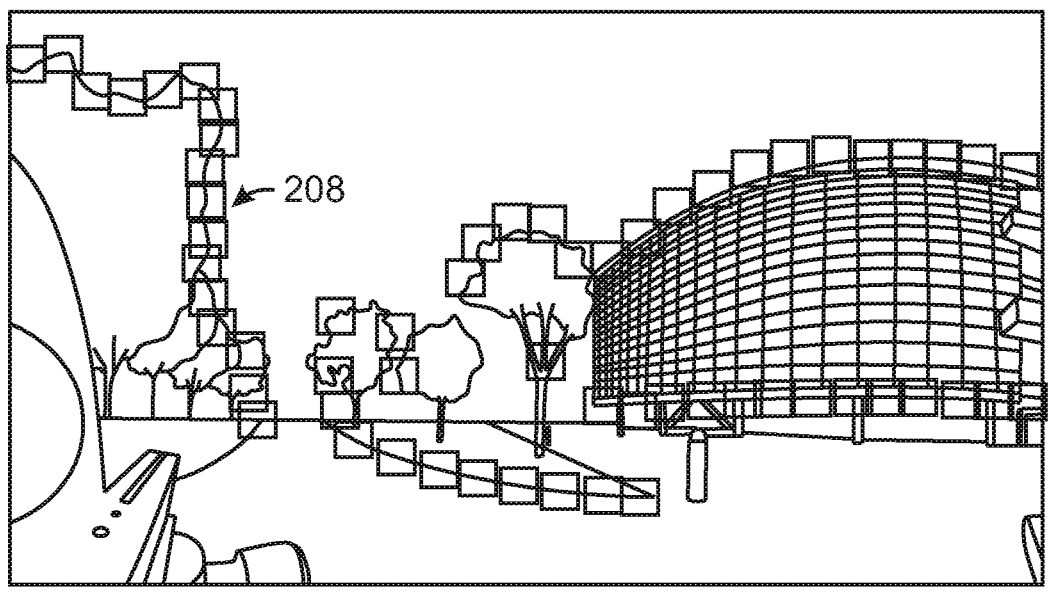

FIG. 2 is a stereoscopic pair of images with coarsely derived dense feature points. FIG. 2 includes an image 202 and an image 204. The image 202 includes a plurality of dense feature points 206. Similarly, the image 204 includes a plurality of dense feature points 208. In embodiments, the image 202 and the image 204 may be down sampled versions of a pair of original input images. A down sampled image may include less information and fewer pixels when compared to the original image.

Dense feature matching as defined herein derives dense correspondences on a down sampled image. For example, dense feature matching may define a feature correspondence per pixel in a given down sampled image. Defining dense matches on the down sampled stereo images may involve optimizing a cost function containing a data term, spatial smoothness term, and a small displacement term. The data term enforces the visual similarity between a point in one image and its match in another image. The small displacement term enforces the flow vectors to be as small as possible when the available information is not sufficient in making a decision, and the smoothness term enforces the flow vectors of adjacent pixels to be similar.

Sparse feature matching guided by a coarse estimate from dense feature matching significantly increases the number of correct matches with at least quarter-pixel accuracy, while keeping the computational cost smaller than that of dense matching alone. Sub-pixel accuracy as applied to feature correspondences may refer to the determination of accurate features within a portion of the pixel. For example, quarter pixel accuracy of matching indicates that a candidate pair of points is accurate to within a particular quarter of a pixel. In this manner, the particular quarter-pixel in a first image matches another quarter-pixel in a second image. Moreover, as used herein, matching refers to identifying corresponding or related features in an image. Features may correspond to another feature when data used to describe the features are substantially the same.

Figure 3:
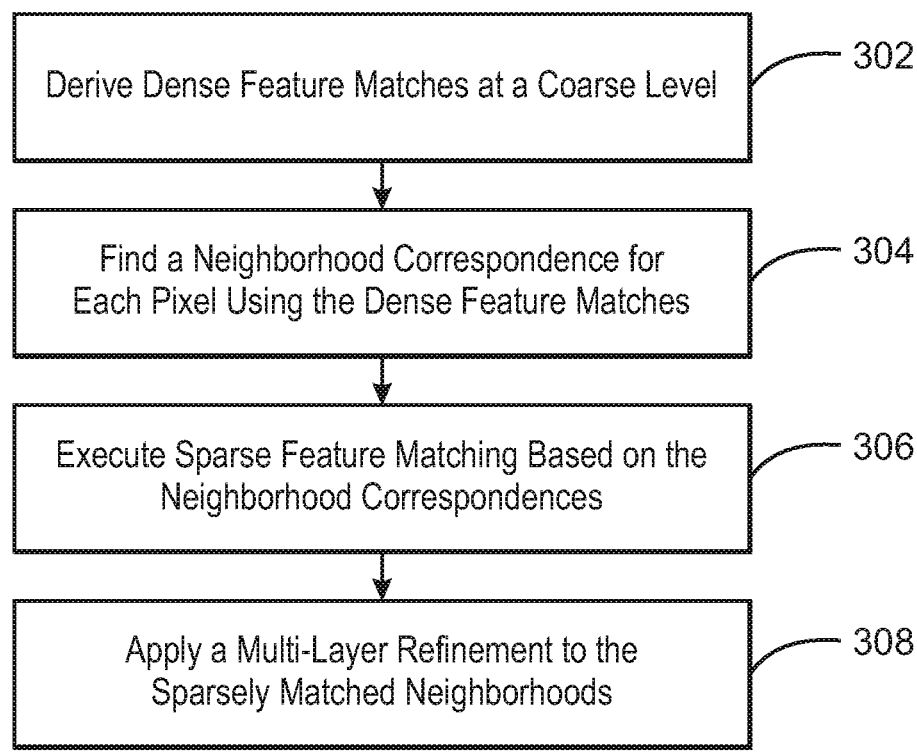
FIG. 3 is a process flow diagram of a method for guided sparse feature matching via coarsely defined dense feature matches.

FIG. 3 is a process flow diagram of a method 300 for guided sparse feature matching via coarsely defined dense feature matches. At block 302, dense feature matching is executed on an image pair that is down sampled to obtain a first set of feature correspondences for each pixel of the down sampled image pair. Accordingly, initial feature matches are derived in a dense manner at a very coarse level. At block 304, neighborhood correspondences are calculated based on the first set of feature correspondences for each pixel in a first image of the image pair.

At block 306, sparse feature matching is executed on stereoscopic patch pairs from the image pair based on the neighborhood correspondence for each pixel to obtain correspondence estimates for each stereoscopic patch pair. In this manner, the neighborhood correspondence information is used as a guide a second level multi scale sparse feature matching. The second level multi scale sparse feature matching is used to limit the number of outliers typically raised due to the absence of geometrical awareness in classical sparse feature matching approaches. Geometrical awareness as well as smoothness considerations may be included in the sparse feature matching according to the present techniques via the neighborhood correspondences. In particular, sparse feature matching is done between patch pairs which significantly reduces the search space, where patch pairs are defined via the estimated dense correspondences, such as the dense correspondences described with respect to FIG. 2. Thus, the second level multi-scale sparse feature matching defines semi-dense correspondences across a large collection of overlapping patch pairs. The overlapping patch pairs may be determined using a set of predefined parameters for scale, window size, and steps around each estimated dense correspondence.

At block 308, the correspondence estimates are refined for each stereoscopic patch pair to obtain a semi-dense set of feature correspondences by applying a geometric constraint to the correspondence estimates and retaining correspondences that satisfy the geometric constraint. This a multilayer refinement stage is applied to the collection of overlapping patch pairs. The refinement stage enforces repeatability across multiple patches, small spatial distance from the initial dense correspondence estimate at the coarse level, strong visual similarity between the correspondences, as well as ensuring the final matches being in compliance with the epipolar constraint.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation.

Figure 4A:
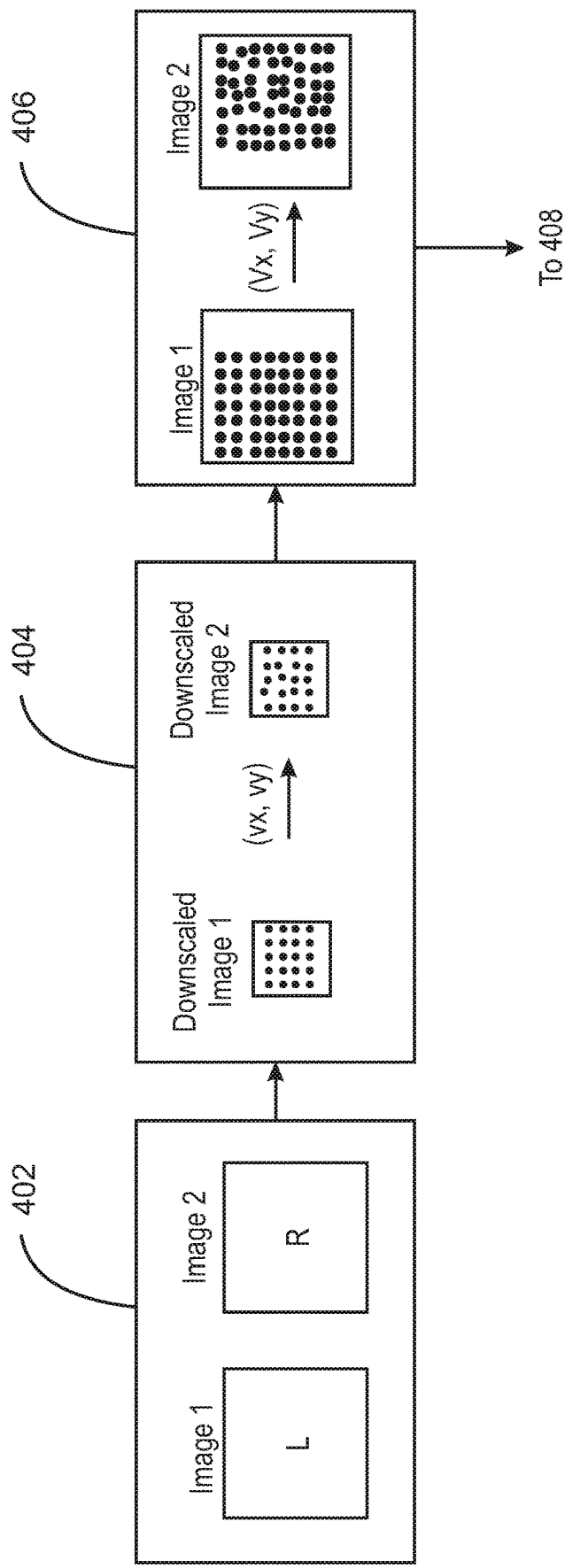
FIGS. 4A, 4B, and 4C are block diagrams illustrating guided sparse feature matching via coarsely defined dense matches.
Figure 4B:
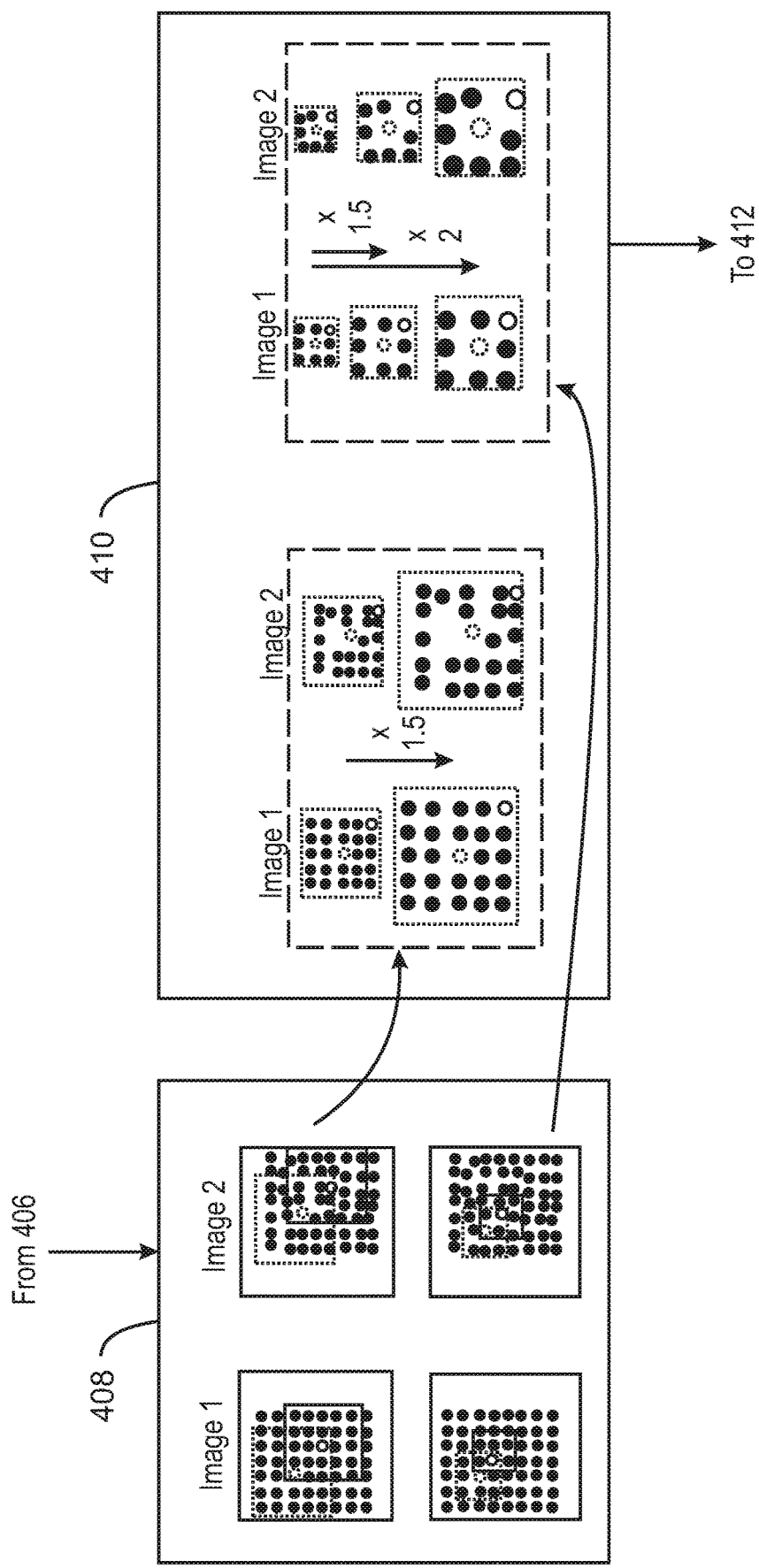
Figure 4C:
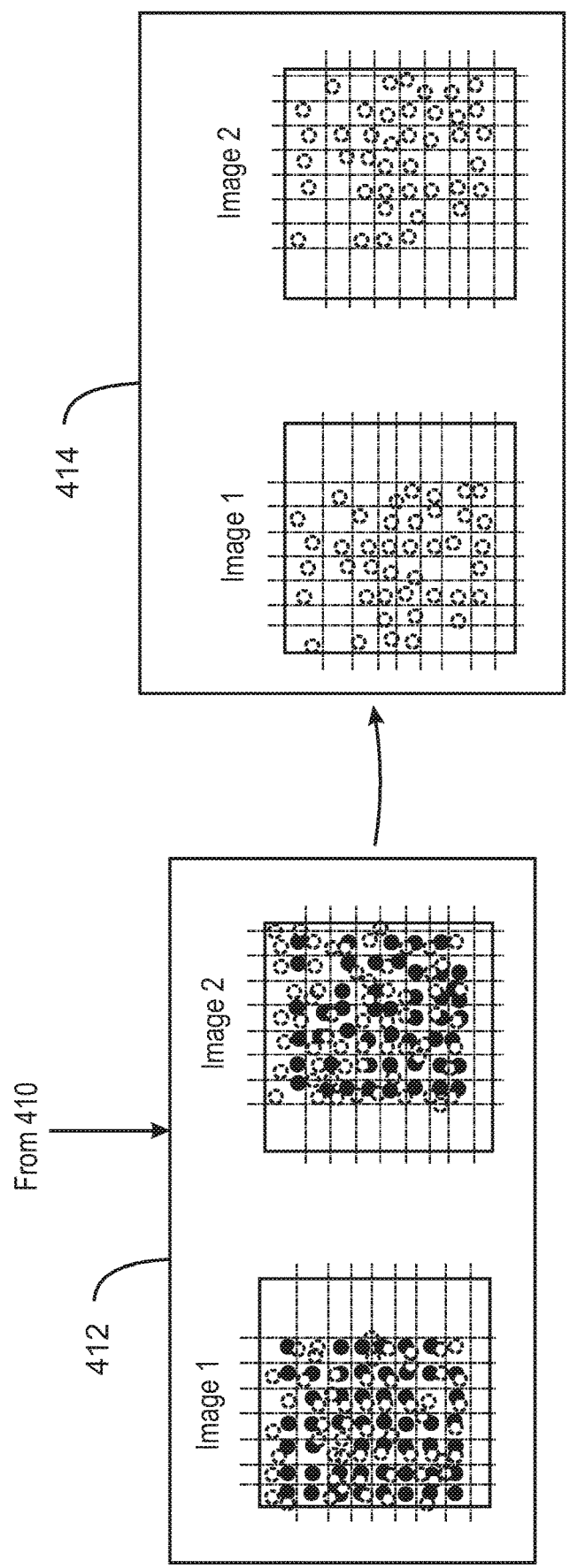

FIGS. 4A, 4B, and 4C are block diagrams illustrating guided sparse feature matching via coarsely defined dense matches. The sparse feature matching according to the present techniques is encoded with geometrical constraints and smoothness considerations. In conventional sparse feature matching, it is a common approach to encode the epipolar constraints either in a post processing step to remove outliers, or limiting the search for the correspondence to the space outlined by the epipolar constraint. However, estimating an accurate essential matrix is often challenging when there exist a limited number of robust matches. An essential matrix may be a 3×3 matrix which relates corresponding points on stereo images assuming that the camera satisfies the pinhole camera model. The present techniques enable sparse feature matching in view of geometric constraints and smoothness without the use of an essential matrix.

In FIG. 4A, the original pair of stereo images is illustrated at block 402. A stereoscopic pair of images may include a left image and a right image. The left image may include image data that overlaps with the image data of the right image, along with additional image data to the left side of the image. The right image may include image data that overlaps with the image data of the left image, along with additional image data to the right side of the image. At block 404, dense correspondence estimates are illustrated for downscaled versions of the original stereoscopic images.

Additionally, at block 404 the corresponding flow vectors (vx, vy) are described for each of the course images. At block 406, each of the dense correspondence estimates and corresponding flow vectors found at block 404 are mapped from the course level at block 404 to fine level images and corresponding flow vectors (Vx, Vy).

As illustrated in FIG. 4A, initial dense correspondences are introduced at a very coarse level. Dense matching defines feature correspondences for each pixel across stereo images by enforcing visual similarity, spatial smoothness, and small displacements. While it is computationally expensive, it can generally define highly accurate neighborhood correspondence for each pixel.

In FIG. 4B, at block 408 examples of overlapping stereo patches defined using different steps and window sizes covering different spatial neighborhoods around to sample dense correspondences are illustrated. The overlapping patches are illustrated by the dashed lines and circles and a solid line circle and box. Here, an approximate matching neighborhood is defined for each pixel in an image, while keeping the computational cost low by computing dense correspondences on a very coarse image down sampled by a factor of 4. This neighborhood correspondence information is mapped to the fine level image and used as a guide for the second level multi scale sparse feature matching. In particular, this coarsely defined dense feature correspondence map defines central points for a large group of overlapping windows with variable sizes across multiple scales. This approach limits the search space for the sparse feature matching significantly, hence limits the number of outliers typically raised due to the absence of geometrical awareness in classical sparse feature matching approaches.

At block 410, examples of stereo patches defined around a single dense correspondence estimate in multiple scales in various sizes to cover different spatial neighborhoods around each estimate is illustrated. Each correspondence estimate is illustrated by a dashed circle. The sparse feature matching process on the stereo patches may be performed done via a ratio test. In embodiments, the ratio test involves finding the 1st nearest neighbor with a distance V1 and the second nearest neighbor with distance V2 to each detected interest point or keypoint. As used herein, a keypoint may be an interest point. Thus, the keypoints may be a set of points defined by feature detection algorithms. If V1/V2<gamma, meaning that the distance of the first nearest neighbor is less than a threshold gamma times the distance of the second nearest neighbor, a match is declared between that particular keypoint and its first nearest neighbor. In addition, to ensure high quality matches, this step is followed by a symmetry test to further eliminate false positive matches. The rich set of correspondences defined by this second-level sparse feature matching on the collection of the patch pairs is followed by a multi-layer refinement stage to further evaluate and enhance the correspondences in small local neighborhoods.

In FIG. 4B, at block 412 an illustration of sparse feature matching results between stereo patches mapped to the original images is illustrated. The dashed grid highlights spatial neighborhoods around each pixel. Also, solid and dashed circles highlight dense correspondence estimates and the sparse matching results on stereo patches, respectively. At block 414, the final correspondence estimates after the refinement stage are illustrated. The multi-layer refinement stage enforces some key characteristics typical for high confidence matches. As used herein, a high confidence match refers to a correspondence estimate that is most likely a correct match.

In embodiments, the refinement stage includes several layers or stages. Generally, the first layer enforces repeatability for each match across patches in a small radius and ranks each match using a geometrical cost function. The geometrical cost function may be defined by the distance from its initial coarse correspondence estimate, as well as the visual similarity score between the corresponding points. The first layer is followed by a second layer that includes a filtering stage to retains the highest-ranking feature correspondence in a 1×1 grid of pixels. The last layer of the refinement stage involves enforcing the epipolar constraint defined via the high confident correspondences established in prior stage.

Specifically, the first layer of the refinement stage defines a small threshold for y gamma to allow keeping only a subset of high-quality matches. Here, y gamma is a ratio test parameter that is equal to a score of the best feature match divided by the score of the second-best feature match. In this manner, y gamma can indicate the probability that a match by taking the ratio of distance from the closest neighbor to the distance of the second closest. Further, this first layer reduces the set of correspondences by adding an additional constraint on the L1 distance measured between the estimated correspondence point computed via the sparse matching scheme and that of the dense matching on the coarse level image. An L1 distance between two points may be the sum of absolute differences of their coordinates.

The second layer of the refinement stage computes the number of encounters of a given feature in a certain radius surrounding it, and only keeps features that consistently appear as a match via sparse matching of multi-scale overlapping stereo patches. The third layer of the refinement stage focuses on a much smaller spatial neighborhood around each matching pixel. Specifically, it enables a single feature to be derived for each 1-pixel×1-pixel grid, and retains the feature that has the largest visual similarity with its match. In embodiments, if there are multiple points with the same visual similarity score, the algorithm keeps the one with the smallest distance from the dense correspondence estimate. Since each estimated correspondence is defined in a small spatial neighborhood, it is generally found to be in accordance with epipolar constraints as well. In embodiments, the last layer of the refinement stage removes correspondence estimates that may not be in compliance with epipolar constraints. The set of points at the output of the third layer of the refinement stage are used to estimate an essential matrix. The essential matrix may be used to remove any correspondence estimates that do not agree with the defined epipolar constraint. The output of this layer defines the final set of correspondence estimates according to the present techniques.

The block diagram of FIGS. 4A, 4B, and 4C are not intended to indicate that sparse feature matching guided by coarsely defined matches is to include all of the blocks illustrated in FIGS. 4A, 4B, and 4C. Rather, the sparse feature matching guided by coarsely defined matches described by FIGS. 4A, 4B, and 4C can be implemented using fewer or additional blocks not illustrated in FIG. 3 (e.g., constraints, layers, images, feature detection schemes, etc.).

As described above, the present techniques define a semi-dense (a large number of) matches between a pair of images while minimizing the computational cost associated with dense matching. In addition, the present techniques achieve subpixel accuracy, with less than quarter-pixel discrepancy tolerance, for the defined correspondences. Moreover, the present techniques minimize the number of mismatches typically defined in sparse matching schemes by using the coarsely defined dense correspondences as a guide to the sparse feature matching. The present techniques are not limited to a particular sparse feature matching technique. Moreover, the present techniques are not limited to a particular dense feature matching technique. Thus, the techniques presented herein can be applied to other dense matching and/or sparse matching approaches as well.

The table below illustrates the effectiveness of the present techniques compared to the conventional matching approaches and a sparse feature matching approach through a series of experiments. Note that even though dense matching defines a correspondence estimate for each pixel, the performance is not desirable for applications in need of very accurate estimated correspondences (e.g. when having less than quarter-pixel discrepancy tolerance).

TABLE 1

| THR | Per | Dense Matching | Sparse Matching | Present Techniques − Refinement | Present Techniques + Refinement |
|---|---|---|---|---|---|
| 0.5 pixel | TP | 3011763 | 2107 | 12871 | 4135 |
| | Prec | 0.96 | 0.76 | 0.84 | 0.87 |
| 0.25 pixel | TP | 0 | 1128 | 9329 | 3200 |
| | Prec | 0 | 0.53 | 0.61 | 0.67 |
| 0.1 pixel | TP | 0 | 459 | 4007 | 1432 |
| | Prec | 0 | 0.22 | 0.26 | 0.30 |

In addition, Table 1 demonstrates quantitative results for the feature matching performance of the baseline approaches using dense matching, and sparse feature matching, as well as the present techniques before and after the refinement stage. It can be seen that the present techniques achieve a superior performance compared the baseline approaches. Moreover, Table 1 confirms that the present techniques can achieve matching accuracy at quarter-pixel. A subpixel accuracy is not possible using dense matching approaches. In addition, the number of true positive matches is significantly higher than that of sparse matching. Further, it can be seen that depending on the particular application, both correspondences before and after refinement could be beneficial. In particular, without refinement the present techniques achieve a significantly higher number of feature correspondences with slightly smaller precision score. To gain additional precision, one can benefit from adding the refinement stage.

In Table 1, the number of true positive (TP) matches and the precision (Prec) for various thresholds of subpixel accuracy are given. It can be seen that the present techniques achieve a superior performance compared to baseline approaches for small thresholds.

Also, the reported computational times of the present techniques is smaller than that of dense matching on its own, while being slightly larger than that of sparse matching. Together with the results in Table 1, the computational time illustrates that the present techniques achieve superior performance compared to the purely dense or sparse matching approaches for subpixel accuracy with less than quarter-pixel discrepancy tolerance. Again, even though dense matching defines a correspondence estimate for each pixel, the performance is not desirable for applications in need of correspondence estimates with quarter-pixel accuracy or more.

The present techniques enable an approximate neighborhood correspondence for each pixel in an image, while keeping the computational cost low. This neighborhood correspondence information is used as a guide for the second level multi scale sparse feature matching, thus limiting the number of outliers typically raised due to the absence of geometrical awareness in classical sparse feature matching approaches. The semi-dense correspondences defined by the second-level sparse feature matching across the large collection of overlapping patch pairs is followed by a multi-layer refinement stage. The refinement stage enforces repeatability across multiple patches, small spatial distance from the initial dense correspondence estimate at the coarse level, strong visual similarity between the correspondences, as well as ensuring the final matches being in compliance with the epipolar constraint. As discussed above, experimental results confirm the suitability of the proposed algorithm.

Computer vision applications involved in analyzing multi-view images captured with multi-camera systems require abundant and accurate feature matches. Some examples include dynamic calibration, image stitching, view interpolation, structure from motion, etc. The present techniques can be integrated as part of the tracking system in a multi-camera system used in surveillance or automotive surround camera systems. Another usage is in the 360 camera arrays for immersive VR content, or in multi-drone systems for image stitching. Thus, this technology could be a key component of future multi-camera systems.

Figure 5:
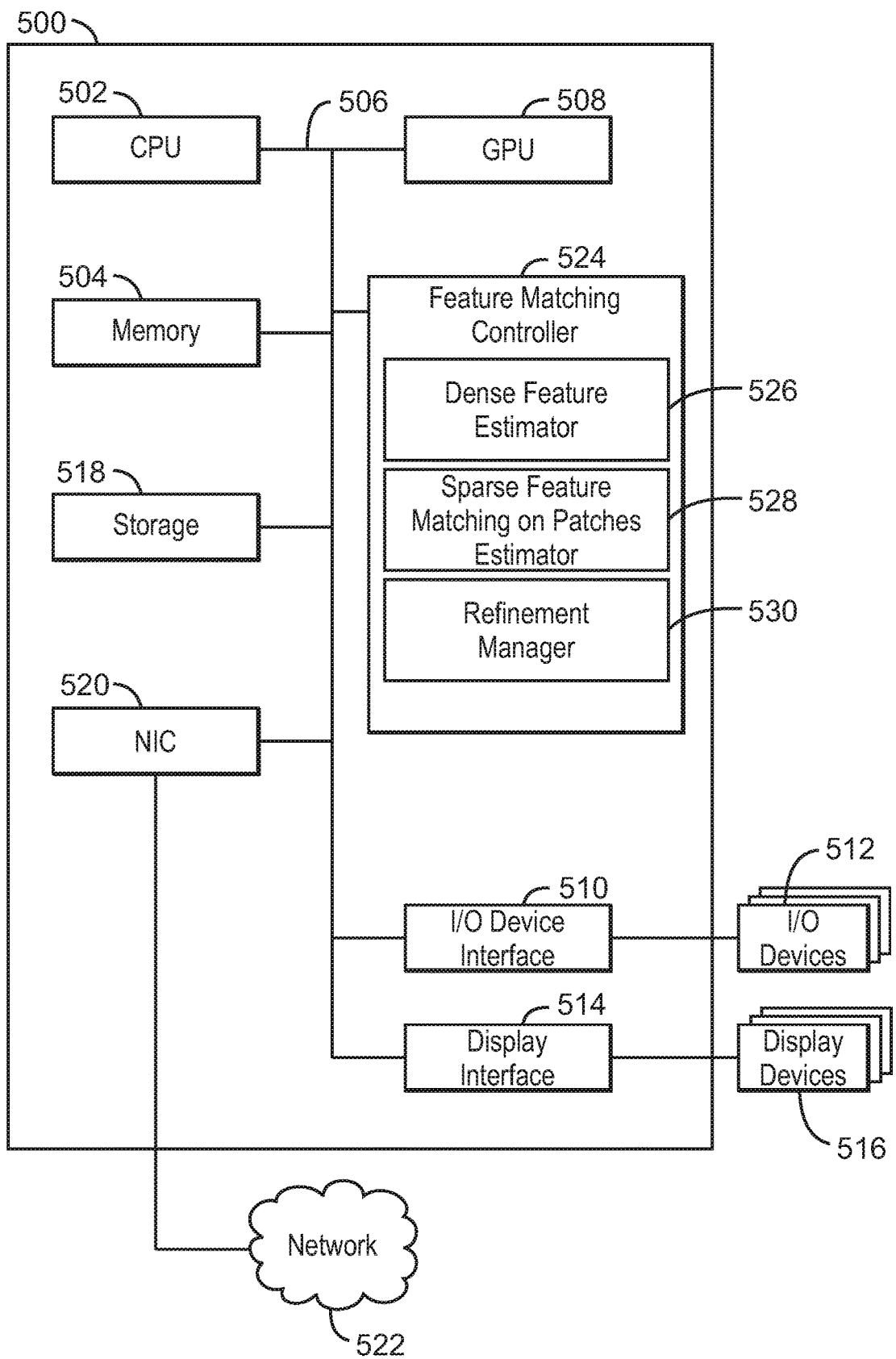
FIG. 5 is a block diagram illustrating guided sparse feature matching via coarsely defined dense matches.

Referring now to FIG. 5, a block diagram is shown of a computing device 500 that enables guided sparse feature matching via coarsely defined dense matches. The computing device 500 may be, for example, a laptop computer, desktop computer, tablet computer, mobile device, or wearable device, among others. In some examples, the computing device 500 may be a smart camera or a digital security surveillance camera. The computing device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. In some examples, the CPU 502 may be a system-on-chip (SoC) with a multi-core processor architecture. In some examples, the CPU 502 can be a specialized digital signal processor (DSP) used for image processing. The memory device 504 can include random access memory (RAM), read only memory (ROM), flash memory, or any other suitable memory systems. For example, the memory device 504 may include dynamic random-access memory (DRAM).

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a viewer of the computing device 500.

The CPU 502 may also be connected through the bus 506 to an input/output (I/O) device interface 510 configured to connect the computing device 500 to one or more I/O devices 512. The I/O devices 512 may include, for example, a keyboard and a pointing device, wherein the pointing device may include a touchpad or a touchscreen, among others. The I/O devices 512 may be built-in components of the computing device 500, or may be devices that are externally connected to the computing device 500. In some examples, the memory 504 may be communicatively coupled to I/O devices 512 through direct memory access (DMA).

The CPU 502 may also be linked through the bus 506 to a display interface 514 configured to connect the computing device 500 to a display device 516. The display devices 516 may include a display screen that is a built-in component of the computing device 500. The display devices 516 may also include a computer monitor, television, or projector, among others, that is internal to or externally connected to the computing device 500. The display device 516 may also include a head mounted display.

The computing device 500 also includes a storage device 518. The storage device 518 is a physical memory such as a hard drive, an optical drive, a thumbdrive, an array of drives, a solid-state drive, or any combinations thereof. The storage device 518 may also include remote storage drives.

The computing device 500 may also include a network interface controller (NIC) 520. The NIC 520 may be configured to connect the computing device 500 through the bus 506 to a network 522. The network 522 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 500 further includes a feature matching controller 524. The feature matching controller 524 may be configured to enables guided sparse feature matching via coarsely defined dense matches. The feature matching controller 524 includes a dense feature estimator 526. The dense feature estimator 526 may be enable dense feature matching as described in FIG. 2, the method 300 of FIG. 3, the block diagram of FIG. 4A, or the dense feature module 606 of FIG. 6.

The feature matching controller 526 also includes a sparse feature estimator 528. The sparse feature estimator 528 may be similar to the sparse feature matching in FIG. 1, the method 300 of FIG. 3, the block diagram of FIG. 4B, or the sparse feature matching on patches module 608 of FIG. 6. Finally, the feature matching controller 526 also includes a refinement manager 530. The refinement manager 530 may enable refinement as described by the method 300 of FIG. 3, the block diagram of FIG. 4C or the refinement module 610 of FIG. 6.

The block diagram of FIG. 5 is not intended to indicate that the computing device 500 is to include all of the components shown in FIG. 5. Rather, the computing device 500 can include fewer or additional components not illustrated in FIG. 5, such as additional buffers, additional processors, and the like. The computing device 500 may include any number of additional components not shown in FIG. 5, depending on the details of the specific implementation. Furthermore, any of the functionalities of the feature matching controller 524, dense feature estimator 526, sparse feature estimator 528, or the refinement manager 530, may be partially, or entirely, implemented in hardware and/or in the processor 502. For example, the functionality may be implemented with an application specific integrated circuit, in logic implemented in the processor 502, or in any other device. For example, the functionality of the feature matching controller 524 may be implemented with an application specific integrated circuit, in logic implemented in a processor, in logic implemented in a specialized graphics processing unit such as the GPU 508, or in any other device.

Figure 6:
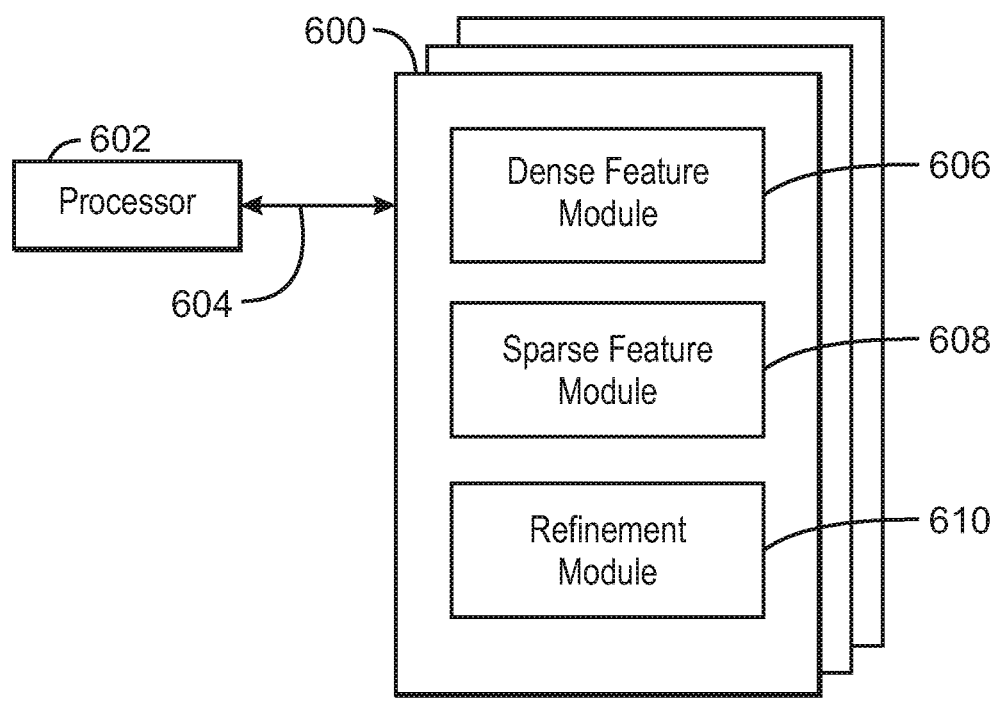
FIG. 6 is a block diagram showing computer readable media that stores code for guided sparse feature matching via coarsely defined dense matches.

FIG. 6 is a block diagram showing computer readable media 600 that store code for guided sparse feature matching via coarsely defined dense matches. The computer readable media 600 may be accessed by a processor 602 over a computer bus 604. Furthermore, the computer readable medium 600 may include code configured to direct the processor 602 to perform the methods described herein. In some embodiments, the computer readable media 600 may be non-transitory computer readable media. In some examples, the computer readable media 600 may be storage media.

The various software components discussed herein may be stored on one or more computer readable media 600, as indicated in FIG. 6. For example, a dense feature module 606 may be configured to execute dense feature matching on an image pair that is down sampled to obtain a first set of feature correspondences for each pixel of the down sampled image pair. Neighborhood correspondences may be calculated based on the first set of feature correspondences for each pixel in a first image of the image pair A sparse feature module 608 can be configured to execute sparse feature matching on stereoscopic patch pairs from the image pair based on the neighborhood correspondence for each pixel to obtain correspondence estimates for each stereoscopic patch pair. A refinement module 610 may be configured to refine correspondence estimates for each stereoscopic patch pair to obtain a semi-dense set of feature correspondences by applying a geometric constraint to the correspondence estimates and retaining correspondences that satisfy the geometric constraint.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

The present techniques present an approach to define a large number of feature correspondences with quarter-pixel accuracy across stereo images in an efficient manner. This is valuable as having a large number of matches allows to better estimate various application parameters, and in many application scenarios very accurate correspondence estimates are required. In particular, the present techniques define an algorithm for guided sparse feature matching via dense correspondence estimates at a coarse level. This new framework addresses the shortcomings associated with dense and/or sparse feature matching approaches, aiming to significantly increase the number of correct matches with quarter-pixel accuracy, while keeping the computational cost much smaller than that of dense matching.

EXAMPLES

Example 1 is a method. The method includes executing dense feature matching on an image pair that is down sampled to obtain a first set of feature correspondences for each pixel of the down sampled image pair; calculating a neighborhood correspondence based on the first set of feature correspondences for each pixel in a first image of the image pair; executing sparse feature matching on stereoscopic patch pairs from the image pair based on the neighborhood correspondence for each pixel to obtain correspondence estimates for each stereoscopic patch pair; and refining the correspondence estimates for each stereoscopic patch pair to obtain a semi-dense set of feature correspondences by applying a geometric constraint to the correspondence estimates and retaining correspondences that satisfy the geometric constraint.

Example 2 includes the method of example 1, including or excluding optional features. In this example, the geometric constraint is a multi-layer refinement stage that comprises a geometrical cost function that is defined by a distance from its initial coarse correspondence estimate, as well as the visual similarity score between the corresponding points.

Example 3 includes the method of any one of examples 1 to 2, including or excluding optional features. In this example, the image pair is down sampled by a factor of four.

Example 4 includes the method of any one of examples 1 to 3, including or excluding optional features. In this example, the geometric constraint comprises computing a number of encounters of a given feature in a certain radius surrounding it, and retaining features that consistently appear as a match via sparse matching of multi-scale overlapping stereo patches.

Example 5 includes the method of any one of examples 1 to 4, including or excluding optional features. In this example, the geometric constraint comprises: defining a single feature for each 1-pixel×1-pixel grid of each image of the image pair; and retaining the feature that has the largest visual similarity with its match.

Example 6 includes the method of any one of examples 1 to 5, including or excluding optional features. In this example, the sparse feature matching on stereoscopic patch pairs is enabled by a ratio test.

Example 7 includes the method of any one of examples 1 to 6, including or excluding optional features. In this example, the dense feature matching on an image pair that is down sampled defines central points for a large group of overlapping windows with variable sizes across multiple scales to obtain the first set of feature correspondences.

Example 8 includes the method of any one of examples 1 to 7, including or excluding optional features. In this example, the second level multi-scale sparse feature matching limits the number of outliers typically raised due to the absence of geometrical awareness in classical sparse feature matching approaches Example 9 includes the method of any one of examples 1 to 8, including or excluding optional features. In this example, the dense feature matching may be according to SIFT dense feature matching, local binary pattern (LBP), or any combination thereof.

Example 10 includes the method of any one of examples 1 to 9, including or excluding optional features. In this example, the sparse feature matching is according to SIFT sparse feature matching, SURF feature matching, or any combination thereof.

Example 11 is a system for game status detection. The system includes a dense feature estimator to execute dense feature matching on an image pair that is down sampled to obtain a first set of feature correspondences for each pixel of the down sampled image pair and calculate a neighborhood correspondence based on the first set of feature correspondences for each pixel in a first image of the image pair; a sparse feature estimator to execute sparse feature matching on stereoscopic patch pairs from the image pair based on the neighborhood correspondence for each pixel to obtain correspondence estimates for each stereoscopic patch pair; and a refinement manager to refine the correspondence estimates for each stereoscopic patch pair to obtain a semi-dense set of feature correspondences by applying a geometric constraint to the correspondence estimates and retaining correspondences that satisfy the geometric constraint.

Example 12 includes the system of example 11, including or excluding optional features. In this example, the geometric constraint is a multi-layer refinement stage that comprises a geometrical cost function that is defined by a distance from its initial coarse correspondence estimate, as well as the visual similarity score between the corresponding points.

Example 13 includes the system of any one of examples 11 to 12, including or excluding optional features. In this example, the image pair is down sampled by a factor of four.

Example 14 includes the system of any one of examples 11 to 13, including or excluding optional features. In this example, the geometric constraint comprises computing a number of encounters of a given feature in a certain radius surrounding it, and retaining features that consistently appear as a match via sparse matching of multi-scale overlapping stereo patches.

Example 15 includes the system of any one of examples 11 to 14, including or excluding optional features. In this example, the geometric constraint comprises: defining a single feature for each 1-pixel×1-pixel grid of each image of the image pair; and retaining the feature that has the largest visual similarity with its match.

Example 16 includes the system of any one of examples 11 to 15, including or excluding optional features. In this example, the sparse feature matching on stereoscopic patch pairs is enabled by a ratio test.

Example 17 includes the system of any one of examples 11 to 16, including or excluding optional features. In this example, the dense feature matching on an image pair that is down sampled defines central points for a large group of overlapping windows with variable sizes across multiple scales to obtain the first set of feature correspondences.

Example 18 includes the system of any one of examples 11 to 17, including or excluding optional features. In this example, the second level multi-scale sparse feature matching limits the number of outliers typically raised due to the absence of geometrical awareness in classical sparse feature matching approaches Example 19 includes the system of any one of examples 11 to 18, including or excluding optional features. In this example, the dense feature matching may be according to SIFT dense feature matching, local binary pattern (LBP), or any combination thereof.

Example 20 includes the system of any one of examples 11 to 19, including or excluding optional features. In this example, the sparse feature matching is according SIFT sparse feature matching, SURF feature matching, or any combination thereof.

Example 21 is at least one non-transitory computer-readable medium. The computer-readable medium includes instructions that direct the processor to execute dense feature matching on an image pair that is down sampled to obtain a first set of feature correspondences for each pixel of the down sampled image pair; calculate a neighborhood correspondence based on the first set of feature correspondences for each pixel in a first image of the image pair; execute sparse feature matching on stereoscopic patch pairs from the image pair based on the neighborhood correspondence for each pixel to obtain correspondence estimates for each stereoscopic patch pair; and refine the correspondence estimates for each stereoscopic patch pair to obtain a semi-dense set of feature correspondences by applying a geometric constraint to the correspondence estimates and retaining correspondences that satisfy the geometric constraint.

Example 22 includes the computer-readable medium of example 21, including or excluding optional features. In this example, the geometric constraint is a multi-layer refinement stage that comprises a geometrical cost function that is defined by a distance from its initial coarse correspondence estimate, as well as the visual similarity score between the corresponding points.

Example 23 includes the computer-readable medium of any one of examples 21 to 22, including or excluding optional features. In this example, the geometric constraint comprises computing a number of encounters of a given feature in a certain radius surrounding it, and retaining features that consistently appear as a match via sparse matching of multi-scale overlapping stereo patches.

Example 24 includes the computer-readable medium of any one of examples 21 to 23, including or excluding optional features. In this example, the geometric constraint comprises: defining a single feature for each 1-pixel×1-pixel grid of each image of the image pair; and retaining the feature that has the largest visual similarity with its match.

Example 25 includes the computer-readable medium of any one of examples 21 to 24, including or excluding optional features. In this example, the sparse feature matching on stereoscopic patch pairs is enabled by a ratio test.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method, comprising:
   executing dense feature matching on an image pair that is down sampled to obtain a first set of feature correspondences for a pixel of the down sampled image pair;
   calculating a neighborhood correspondence based on the first set of feature correspondences for the pixel in a first image of the image pair;
   executing sparse feature matching on at least one stereoscopic patch pair from the image pair based on the neighborhood correspondence for the pixel to obtain a correspondence estimate for the at least one stereoscopic patch pair;
   applying a geometric constraint to the correspondence estimate; and
   retaining any one or more feature correspondences of the first set of feature correspondences that satisfy the geometric constraint to obtain a semi-dense set of the first set of feature correspondences.

2. The method of claim 1, wherein the geometric constraint is a multi-layer refinement stage, the multi-layer refinement stage including a geometrical cost function that is defined by a distance from an initial coarse correspondence estimate, and a visual similarity score between the corresponding points.

3. The method of claim 1, wherein the image pair is down sampled by a factor of four.

4. The method of claim 1, wherein the applying of the geometric constraint includes computing a number of encounters of a feature in a radius surrounding the feature, and retaining features that appear as a match via sparse matching of multi-scale overlapping stereo patches.

5. The method of claim 1, wherein the applying of the geometric constraint includes:
   defining a set of features of the image pair, the set of features including one feature for each 1-pixel×1-pixel grid of each image of the image pair; and
   retaining a first feature of the defined set of features that has the largest visual similarity between the image pair.

6. The method of claim 1, wherein the sparse feature matching on the at least one stereoscopic patch pair is enabled by a ratio test.

7. The method of claim 1, wherein the dense feature matching on the image pair that is down sampled defines central points for a large group of overlapping windows with variable sizes across multiple scales to obtain the first set of feature correspondences.

8. The method of claim 1, further including matching one or more second level multi-scale sparse features.

9. The method of claim 1, wherein the executing of the dense feature matching is based on at least one of SIFT dense feature matching or local binary pattern (LBP).

10. The method of claim 1, wherein the executing of the sparse feature matching is based on at least one of SIFT sparse feature matching or SURF feature matching.

11. A system for game status detection, comprising:
dense feature estimator hardware circuitry to execute dense feature matching on an image pair, the image pair down sampled to obtain a first set of feature correspondences for a pixel of the down sampled image pair and calculate a neighborhood correspondence based on the first set of feature correspondences for the pixel in a first image of the image pair;
sparse feature estimator hardware circuitry to execute sparse feature matching on at least one stereoscopic patch pair from the image pair based on the neighborhood correspondence for the pixel to obtain a correspondence estimate for the at least one stereoscopic patch pair; and
refinement manager hardware circuitry to:
apply a geometric constraint to the correspondence estimate; and
retain any one or more feature correspondences of the first set of feature correspondences that satisfy the geometric constraint to obtain a semi-dense set of the first set of feature correspondences.

12. The system of claim 11, wherein the geometric constraint is a multi-layer refinement stage that includes a geometrical cost function that is defined by a distance from its initial coarse correspondence estimate, as well as a visual similarity score between the corresponding points.

13. The system of claim 11, wherein the image pair is down sampled by a factor of four.

14. The system of claim 11, wherein the refinement manager hardware circuitry is to determine a number of encounters of a feature in a radius surrounding the feature, and retain features that appear as a match via sparse matching of multi-scale overlapping stereo patches.

15. The system of claim 11, wherein the refinement manager hardware circuitry is to:
define a set of features of the image pair, the set of features including one feature for each 1-pixel×1-pixel grid of each image of the image pair; and
retain a first feature of the defined set of features that has the largest visual similarity between the image pair.

16. The system of claim 11, wherein the sparse feature matching on the at least one stereoscopic patch pair is enabled by a ratio test.

17. The system of claim 11, wherein the dense feature matching on the image pair that is down sampled defines central points for a large group of overlapping windows with variable sizes across multiple scales to obtain the first set of feature correspondences.

18. The system of claim 11, wherein the sparse feature estimator hardware circuitry is to match one or more second level multi-scale sparse features.

19. The system of claim 11, wherein the dense feature estimator hardware circuitry is to execute the dense feature matching based on at least one of SIFT dense feature matching or local binary pattern (LBP).

20. The system of claim 11, wherein the sparse feature estimator hardware circuitry is to execute the sparse feature matching based on at least one of SIFT sparse feature matching and SURF feature matching.

21. At least one non-transitory computer-readable medium, comprising instructions to direct a processor to at least:
execute dense feature matching on an image pair that is down sampled to obtain a first set of feature correspondences for a pixel of a down sampled image pair;
calculate a neighborhood correspondence based on the first set of feature correspondences for the pixel in a first image of the image pair;
execute sparse feature matching on at least one stereoscopic patch pair from the image pair based on the neighborhood correspondence for the pixel to obtain a correspondence estimate for the at least one stereoscopic patch pair;
apply a geometric constraint to the correspondence estimate; and
retain any one or more feature correspondences of the first set of feature correspondences that satisfy the geometric constraint to obtain a semi-dense set of the first set of feature correspondences.

22. The computer readable medium of claim 21, wherein the geometric constrain is a multi-layer refinement stage, the multi-layer refinement stage including a geometrical cost function that is defined by a distance from an initial coarse correspondence estimate, and a visual similarity score between the corresponding points.

23. The computer readable medium of claim 21, wherein the applying of the geometric constraint includes computing a number of encounters of a feature in a radius surrounding the feature and retaining features that appear as a match via sparse matching of multi-scale overlapping stereo patches.

24. The computer readable medium of claim 21, wherein the applying of the geometric constraint includes:
defining a set of features of the image pair, the set of features including one feature for each 1-pixel×1-pixel grid of each image of the image pair; and
retaining a first feature of the defined set of features that has the largest visual similarity between the image pair.

25. The computer readable medium of claim 21, wherein the sparse feature matching on the at least one stereoscopic patch pair is enabled by a ratio test.

* * * * *